United States Patent
Hutchinson et al.

(10) Patent No.: US 8,724,263 B2
(45) Date of Patent: May 13, 2014

(54) METHOD FOR ACTIVE CONTROL OF SPACING BETWEEN A HEAD AND A STORAGE MEDIUM

(75) Inventors: Erik J. Hutchinson, Eden Prairie, MN (US); Daniel P. Burbank, Minneapolis, MN (US); Ladislay R. Pust, Savage, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/532,143

(22) Filed: Jun. 25, 2012

(65) Prior Publication Data

US 2012/0327529 A1 Dec. 27, 2012

Related U.S. Application Data

(60) Continuation-in-part of application No. 12/872,712, filed on Aug. 31, 2010, now Pat. No. 8,208,221, which is a division of application No. 11/201,873, filed on Aug. 11, 2005, now Pat. No. 7,808,746.

(51) Int. Cl.
*G11B 5/127* (2006.01)

(52) U.S. Cl.
USPC .................................... 360/125.74

(58) Field of Classification Search
None
See application file for complete search history.

(56) References Cited

U.S. PATENT DOCUMENTS

| | | | |
|---|---|---|---|
| 5,034,828 A * | 7/1991 | Ananth et al. | 360/75 |
| 5,164,869 A | 11/1992 | Fontana, Jr. et al. | |
| 5,638,237 A | 6/1997 | Phipps et al. | |
| 5,781,377 A | 7/1998 | Koka et al. | |
| 5,991,113 A * | 11/1999 | Meyer et al. | 360/75 |
| 6,074,566 A | 6/2000 | Hsiao et al. | |
| 6,181,514 B1 | 1/2001 | Santini et al. | |
| 6,239,947 B1 | 5/2001 | Fan et al. | |
| 6,330,128 B1 | 12/2001 | Chang et al. | |
| 6,349,014 B1 | 2/2002 | Crue, Jr. et al. | |
| 6,374,481 B1 | 4/2002 | Wachtler et al. | |
| 6,441,982 B1 | 8/2002 | Fukushima et al. | |
| 6,466,404 B1 | 10/2002 | Crue, Jr. et al. | |
| 6,473,274 B1 | 10/2002 | Maimone et al. | |
| 6,535,355 B2 | 3/2003 | Boutaghou et al. | |
| 6,614,628 B2 * | 9/2003 | Crane et al. | 360/294.5 |
| 6,654,202 B2 | 11/2003 | Rea et al. | |
| 6,697,232 B1 * | 2/2004 | Hipwell, Jr. et al. | 360/294.5 |
| 6,747,841 B1 | 6/2004 | Olim et al. | |
| 6,785,086 B1 | 8/2004 | Bonin et al. | |
| 6,867,940 B2 | 3/2005 | Pleiss | |
| 6,992,865 B2 | 1/2006 | Thurn et al. | |
| 6,999,265 B1 * | 2/2006 | Schreck et al. | 360/75 |
| 7,808,746 B2 * | 10/2010 | Burbank et al. | 360/294.3 |
| 8,208,221 B2 * | 6/2012 | Burbank et al. | 360/125.74 |
| 2002/0034035 A1 | 3/2002 | Vettiger et al. | |
| 2002/0071215 A1 | 6/2002 | Lewis et al. | |
| 2002/0191326 A1 | 12/2002 | Xu et al. | |
| 2003/0043497 A1 | 3/2003 | Riddering et al. | |
| 2003/0053264 A1 | 3/2003 | Chen et al. | |

(Continued)

*Primary Examiner* — David D Davis

(74) *Attorney, Agent, or Firm* — David D. Brush; Westman, Champlin & Koehler, P.A.

(57) ABSTRACT

A head using heaters or actuators to control head media spacing is disclosed. In embodiments disclosed the heaters are selectively energized to control a close point of the head for read and/or write operations. As disclosed power is supplied to multiple heaters to generate heat induced protrusion data and the heat induced protrusion data is used to apply power to the multiple heaters for head media spacing control.

20 Claims, 16 Drawing Sheets

(56) References Cited

U.S. PATENT DOCUMENTS

| | | |
|---|---|---|
| 2003/0058559 A1 | 3/2003 | Brand et al. |
| 2003/0076384 A1 | 4/2003 | Tamura et al. |
| 2003/0099054 A1* | 5/2003 | Kamijima ................ 360/59 |
| 2003/0161071 A1 | 8/2003 | Bonin et al. |
| 2003/0184915 A1 | 10/2003 | Kameyama et al. |
| 2003/0235014 A1 | 12/2003 | Yamanaka et al. |
| 2004/0027728 A1 | 2/2004 | Coffey et al. |
| 2005/0057841 A1* | 3/2005 | Stover et al. ................ 360/59 |
| 2005/0213250 A1* | 9/2005 | Kurita et al. ............ 360/234.4 |
| 2006/0171056 A1* | 8/2006 | Suk .............................. 360/69 |
| 2010/0031115 A1 | 2/2010 | Patapoutian et al. |

* cited by examiner

METHOD FOR ACTIVE CONTROL OF SPACING BETWEEN A HEAD AND A STORAGE MEDIUM

RELATED APPLICATIONS

This application is a continuation in part of U.S. application Ser. No. 12/872,712, which is a divisional application of U.S. patent application Ser. No. 11/201,873, filed on Aug. 11, 2005 now U.S. Pat. No. 7,808,746 and the application claims priority to U.S. application Ser. Nos. 12/872,712 and 11/201,873.

BACKGROUND

Data storage devices utilize heads to read data from and/or write data to a data storage media. Reliability of the heads to read and/or write data depends upon control of the spacing between the transducer elements and the media. Read and write transducer elements are fabricated at a trailing edge of the head or slider. Reliability of the read signal from the read transducer element depends upon spacing between the read element and the media. Likewise the reliability of the write signal depends on the spacing between the write pole and the media. The present application relates to operation of the read and/or write elements and active spacing control between the read and/or write elements and the media.

SUMMARY

The present application relates to active control of head media spacing. Embodiments disclosed in the application employ multiple heaters or actuators on a transducer portion of the head. The heaters are controlled via a heater control assembly. In an illustrated embodiment, the heater control assembly implements an initialization algorithm to generate heater induced protrusion data. As disclosed the heater induced protrusion data is used to selectively energize the heaters to adjust the protrusion profile or close point of the head for read and/or write operations. In embodiments described, power is supplied to multiple heaters separately and/or jointly to control the heat induced protrusion of the transducer portion to adjust the close point of the head for read and/or write operations. These and various other features as well as advantages that characterize the present invention will be apparent upon reading of the following detailed description and review of the associated drawings. The above summary is not intended to limit application of the claims to particular features described in the Summary.

DETAILED DESCRIPTION OF ILLUSTRATIVE EMBODIMENTS

Figure 1:
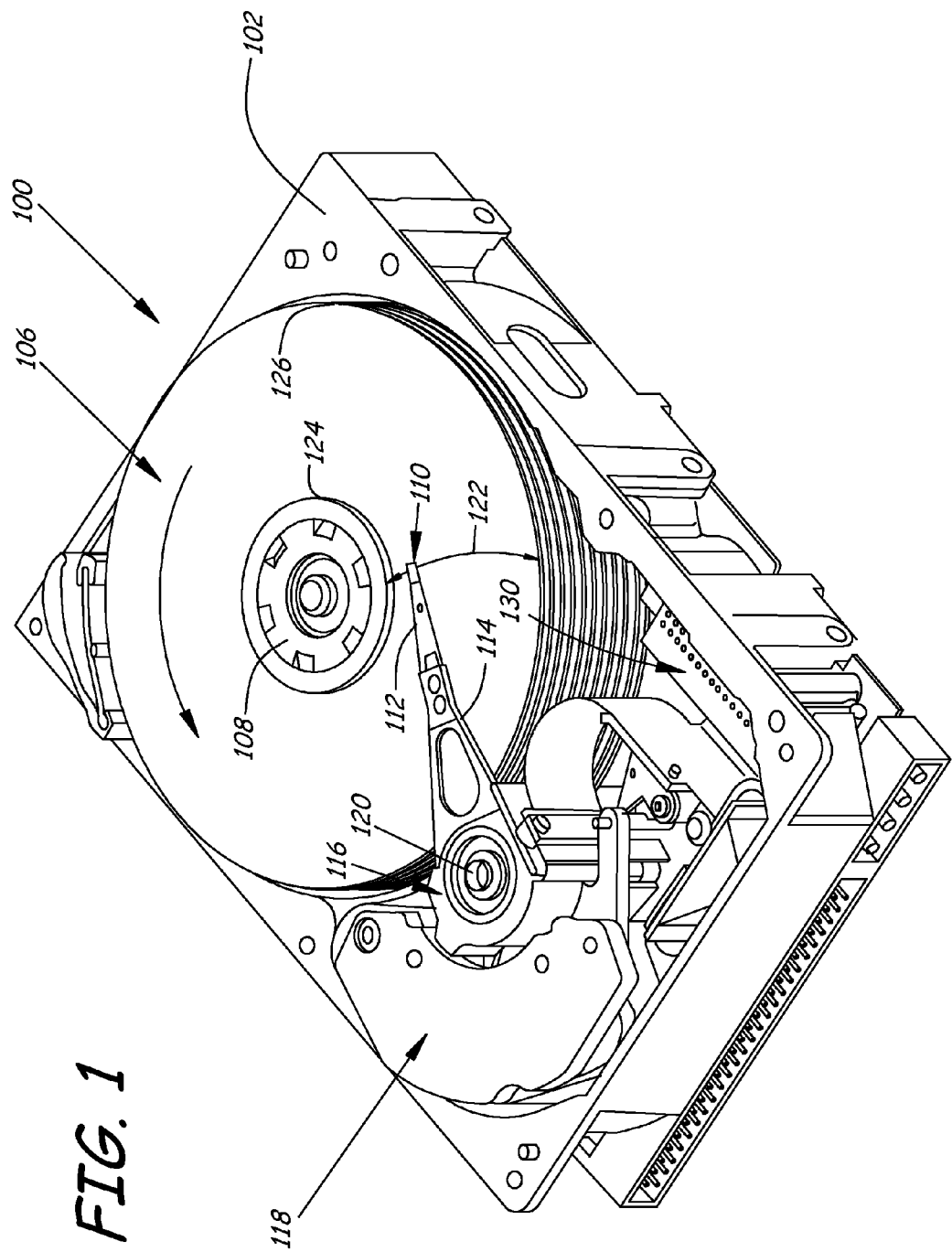
FIG. 1 is a perspective view of an exemplary data storage system in which embodiments of the present invention are employed.

FIG. 1 is an illustration of a data storage device 100 in which embodiments of the present invention are useful. Device 100 includes a housing with a base 102 and a top cover (not shown). The device 100 further includes one or more discs 106, which are mounted on a spindle motor (not shown) by a disc clamp 108. In the illustrated embodiment, a plurality of discs 106 are shown, however application is not limited to a device having a plurality of discs or multiple discs as shown. Read/write heads 110 read data from or write data to the one or more discs 106. The heads 110 include any type of transducing head, such as an inductive head, a magneto-resistive head, an optical head or a magneto-optical head, for example.

Transducer elements of the head 110 are fabricated on a slider. The slider is coupled to a suspension 112, which in turn is attached to track accessing arm 114 of an actuator 116. The actuator shown in FIG. 1 is of the type known as a rotary moving coil actuator and includes a voice coil motor (VCM), shown generally at 118. Voice coil motor 118 rotates actuator 116 and the one or more heads 110 about a pivot shaft 120 to position the one or more heads 110 over a desired data track along a path 122 between a disc inner diameter 124 and a disc outer diameter 126. Voice coil motor 118 is driven by servo electronics 130 based on signals generated by heads 110 and a host computer (not shown). Other types of actuators can also be used, such as linear actuators and application of embodiments described herein is not limited to the particular data storage device shown in FIG. 1.

Figure 2:
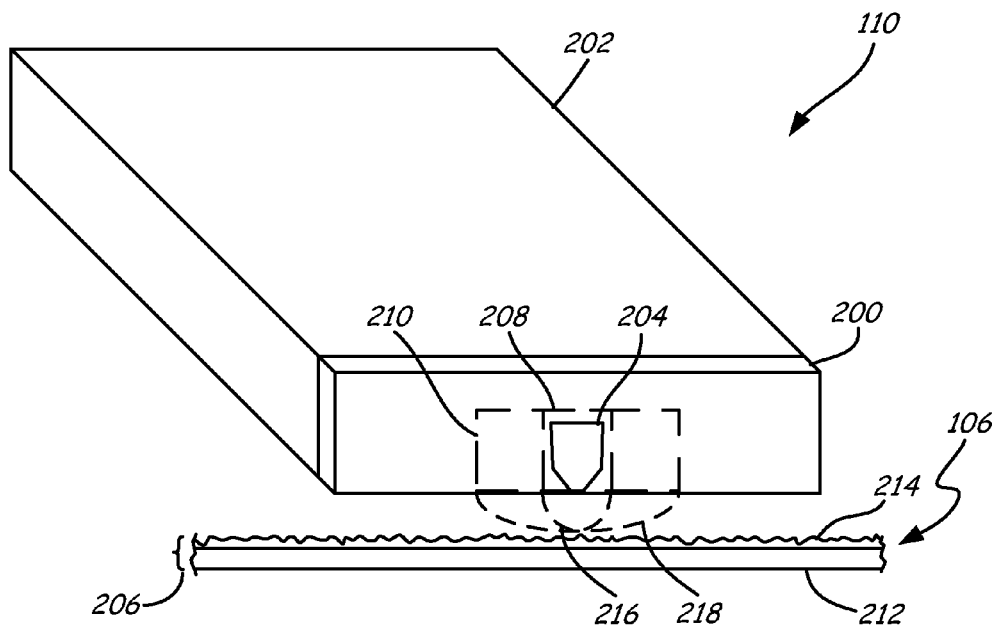
FIG. 2 is a schematic view of a slider above a storage media according to an embodiment of the present invention.

The present invention relates to controlling spacing between heads 110 and the disc or media using multiple actuator or heating elements on the head 110. FIG. 2 is an exemplary embodiment of the head 110. As shown, the head 110 includes a transducer portion 200 fabricated on a slider or slider body 202. The transducer portion 200 includes one or more transducer elements 204 to read data from and/or write data to the data storage disc or media 206. The transducer portion 200 also includes a first portion or region 208 and a second portion or region 210. Storage media 206 includes a base layer 212 and a lubricant layer 214. As discussed below, a first actuator (or heater not shown in FIG. 2) is coupled to head 110 in order to actuate the first portion 208.

Additionally, a second actuator (or second heater not shown in FIG. 2) is coupled to head 110 in order to actuate second portion 210. When the first actuator or heater is operated, thermal expansion of first portion 208 creates a localized protrusion 216 that can be used to position the one or more transducer elements 204 closer to storage medium 206. When the second heater or actuator is operated, thermal expansion of THE second portion 210 creates a larger protrusion 218 that can be used for reliable contact detection between second portion 210 and storage media 206, in particular between second portion 210 and lubricant layer 214. Accordingly, the first heater or actuator is used during write operations and the second heater or actuator is used when detecting contact between head 110 and storage media 206.

Figure 3:
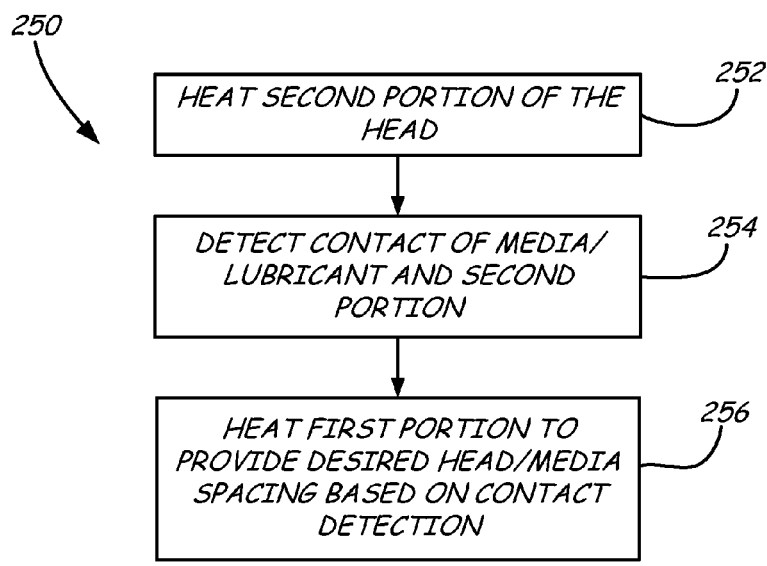
FIG. 3 is a flow diagram of a method in accordance with an embodiment of the present invention.

FIG. 3 is a flow diagram of a method 250 in accordance with an embodiment of the present invention with reference to elements illustrated in FIG. 2. At step 252, the second portion 210 of the transducer portion 200 of the head 110 is heated. Heating second portion 210 provides a large protrusion 218 that interacts with lubricant layer 214. At step 254, contact of storage media 206 (herein lubricant layer 212) and the second portion 210 is detected. At step 256, the first portion 208 is heated to provide a desired head media spacing based on the contact detection. As a result, the head 110 is less susceptible to damage. The larger second portion 210 can reliably contact lubricant layer 214 without causing significant damage to head 110 or more notably the one or more transducer elements 204. Given the point at which second portion 210 contacts lubricant layer 212, suitable power can be supplied to the first heater such that spacing between the one or more transducer elements 204 (and transducer portion 200) and media 206 is minimized. Any form of contact detection can be utilized with the method described above.

Figure 4:
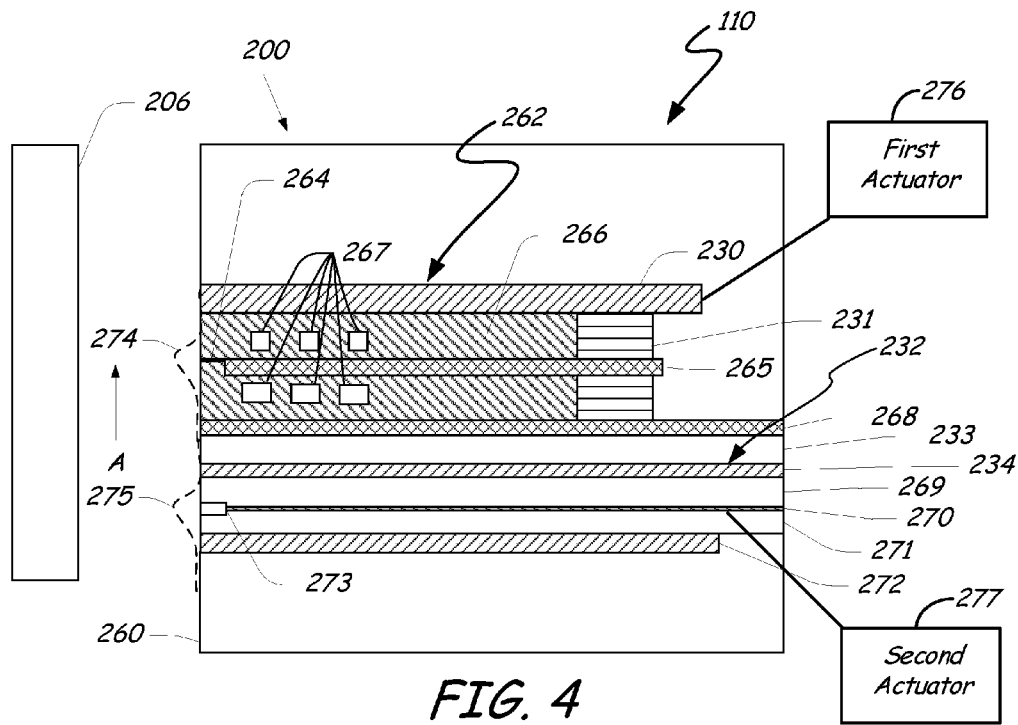
FIG. 4 is a schematic view of a slider above a storage media according to an embodiment of the present invention.

FIG. 4 is a cross-sectional view of an exemplary transducer portion 200 of a magnetic read/write head 110 illustrating transducer elements relative to the magnetic disc 106 or media 206 as taken along a plane normal to an air bearing surface 260 of read/write head 110. As shown, the air bearing surface 260 of magnetic read/write head 110 faces the disc surface or media 206 for proximity or near proximity recording as is known in the art. The media 206 travels or rotates in a direction relative to the magnetic read/write head 110 as indicated by arrow A. A writer assembly 262 of the head 110 includes top pole 230, write pole 264, yoke 265, insulator 266, conductive coils 267 and bottom pole 268. Conductive coils 267 are held in place between yoke 265 and top pole 230 and between yoke 265 and bottom pole 268 by use of insulator 266. Conductive coils 267 are shown in FIG. 4 as two layers of coils but may also be formed of one or more layers of coils as is well known in the field of magnetic read/write head design. The coils 267 can be arranged in a helical, pancake, or any other functional design. A gap closer 231 couples top pole 230, yoke 265 and bottom pole 268. Other configurations for the write assembly 262 can also be used in accordance with the present invention as appreciated by those skilled in the art.

A reader assembly 232 of the head 110 is separated from the writer assembly 262 by a non-magnetic spacer 233 and includes a top shield 234, top gap layer 269, metal contact layer 270, bottom gap layer 271, bottom shield 272, and giant magnetoresistive (GMR) stack 273. Metal contact layer 270 is positioned between top gap layer 269 and bottom gap layer 271. GMR stack 273 is positioned between terminating ends of metal contact layer 270 and bottom gap layer 271. Top gap layer 269 is positioned between top shield 234 and metal contact layer 270. Bottom gap layer 271 is positioned between metal contact layer 270 and bottom shield 272. Other types of readers can also be used, for example those that utilize a CPP (current-perpendicular to the planes) geometry, such as a tunneling magnetoresistance (TMR) reader assembly.

In accordance with an embodiment of the present invention, a first actuator 276 and a second actuator 277 are provided on the read/write head 110. The first actuator 276 is positioned proximate the writer assembly 262, in particular proximate write pole 264 and is adapted to actuate write pole or portion 274 towards the disc or media 206 to position the write elements in close proximity to the media surface 206. The second actuator 277 is positioned proximate the reader assembly 232, and in particular proximate GMR stack 273 or other read element, and is adapted to actuate a second portion 275 of the head 110 towards the disc or media 206 to position the read element 273 in close proximity to the media 206.

Figure 5:
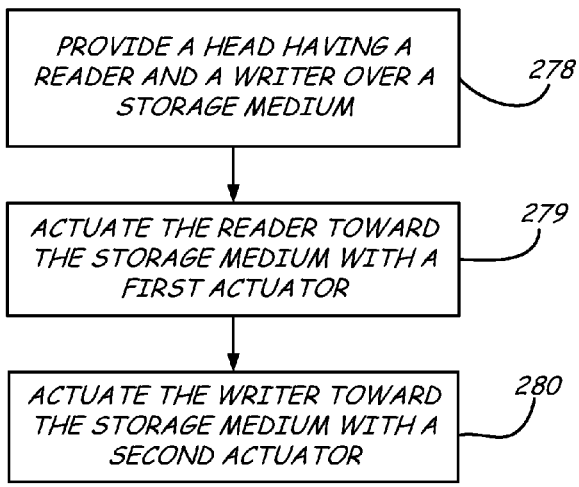
FIG. 5 is a flow diagram of a method in accordance with an embodiment of the present invention.

FIG. 5 is a flow diagram of a method in accordance with an embodiment of the present invention with reference to elements illustrated in FIG. 4. At step 278, a head is provided having a reader assembly 232 and writer assembly 262 above a media surface. At step 279, the reader assembly 232 is actuated toward the storage media 206 using the second actuator 277. When actuating the reader assembly 232 towards the storage media, a more reliable read operation can be achieved. At step 280, the writer assembly 262 is actuated towards the storage media 206 using the first actuator 276. It should be noted that steps 279 and 280 can be used in any order and, as discussed below, can be repeated successively such that reader and writer actuation is performed to achieve simultaneous actuation of both the reader and writer assemblies 262, 232.

It is worth noting that electrical contacts on a slider body 202 are limited. Contacts to the slider may have physical size limitations, and preclude introduction of extra contacts. Further, electrical contacts along the circuit connected to the slider may have limitations in count as well. Increased line count may deleteriously impact suspension mechanical performance and cost, as well as decrease electrical properties. In one particular embodiment of the present invention, an electrical connection coupled to a power source is adapted to drive different electrical elements on the head. The elements can be switches, heaters, actuators, micro-electro-mechanical systems (MEMS), and the like.

As discussed above, it is worthwhile to include two separate actuators 276, 277 for actuating two different portions of the transducer portion 200. For example, one portion can be adapted for reliable contact detection and the other portion can be adapted for reliable write operations. In another embodiment, one actuator is adapted to actuate the reader assembly 232 and one actuator is adapted to actuate the writer assembly 262. To limit the number of electrical contacts on a slider body, two actuators can be driven from a single electrical contact on the slider body. It is further envisioned that three or more electrical elements can be powered through a single electrical connection, for example using a tiered diode set up in which different diodes are powered using different voltage intervals. Alternatively, capacitor and/or inductors can be used with frequencies in a range of intervals. Also, it is possible to control numerous circuit elements from a single electrical connection and ground, such as through the use of transistor-driven decoding of power transfer into numerous actuators using a large interconnected array of conventional transistor logic integrated onto the recording head.

Figure 6:
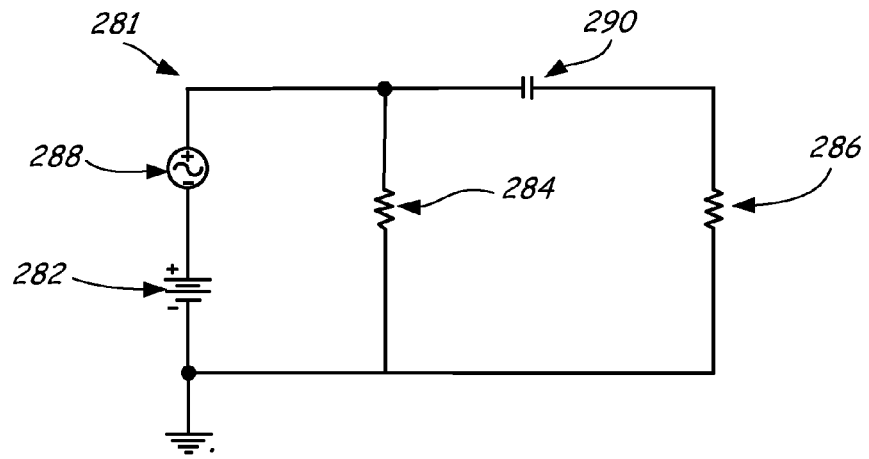
FIG. 6 is an exemplary circuit diagram for controlling multiple heating elements.

In an illustrated embodiment, the heaters or actuators 276, 277 are formed of resistor elements 284, 286 fabricated on the transducer portion 200 of the head 110. FIG. 6 is an exemplary circuit diagram 281 for resistor elements 284, 286 coupled to a single slider body connection. Diagram 281 includes a power supply 282 that provides current to the first resistor (or heater) 284 and a second resistor (or heater) 286. The first resistor 284 heats a first portion of the head and the second resistor 286 heats a second portion of the head as previously described. Both resistors 284 and 286 are coupled to ground. Diagram 281 further illustrates an oscillator 288 to drive second resistor 286. Together, power supply 282 and oscillator 288 provide a power source to the electrical circuit. A capacitive coupling 290 is further provided in the circuit to prevent direct current from reaching resistor 286.

Those skilled in the art will appreciate that various circuit elements can also be used in place of capacitive coupling 290, including other conventional circuit elements having an impedance characterized by what is known by those practiced in the art as a large imaginary contribution to the complex impedance of the element. An example would be inductors. As a result, resistor 284 is driven by direct current from power source 282 and resistor 286 is driven by alternating current created by oscillator 288. In one embodiment, resistor 284 and resistor 286 are 60 ohms, although alternative resistance levels can be used. For example, resistance levels can be from 30-90 ohms. Different levels of capacitance can be used for capacitor 290. In one embodiment, capacitor 290 has a capacitance of 70 pico farads. Other capacitance values can be used, for example from 40-100 pico farads. Different materials can be used for components of the circuit of diagram 281. In one embodiment, resistors 284 and 286 are made of chrome or a chromium alloy.

Figure 7:
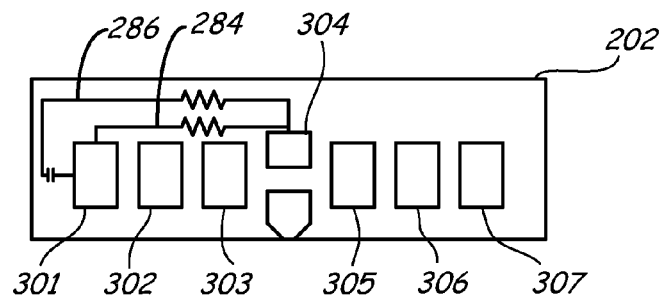
FIG. 7 is a schematic diagram of electrical contacts on a slider body.

FIG. 7 is a schematic diagram of electrical contacts on the slider 202 or head 110. Electrical contacts on the slider 202 are typically in the form of bond pads positioned at a trailing edge of the slider 202 or head 110. As illustrated in FIG. 7, slider body 202 includes bond pads 301, 302, 303, 304, 305, 306 and 307. Bond pad 301 is used as the connection to drive both the first resistor 284 and second resistor 286 as discussed above in relation to diagram 281. Typically, two bond pads, for example bond pads 302 and 303, are used to operate the reader assembly 232, while two other bond pads, for example bond pads 305 and 306, are used to operate the writer assembly 262. Bond pad 304 is a grounding pad. Bond pad 307 can be used during the manufacturing of slider body 202, for example by providing an electronic lapping guide, as is known in the art.

Figure 8:
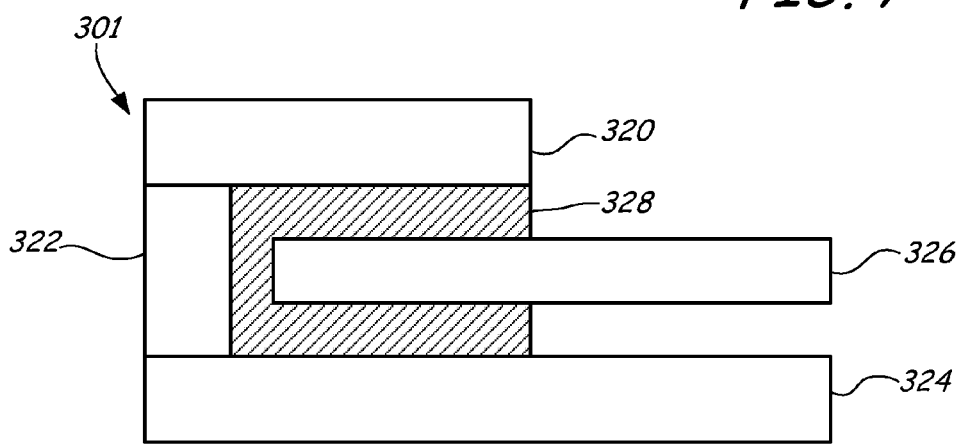
FIG. 8 is a schematic cross section of a bond pad that provides a capacitive coupling.

FIG. 8 is a schematic cross section of bond pad 301 that provides a capacitive coupling. Bond pad 301 includes an electrical connection 320, which can be connected to electronics of the data storage device. A via 322 directly connects electrical contact 320 and a first lead 324. Lead 324 is connected to first resistor 284. Lead 326 is connected to second resistor 286 through a capacitive coupling. A dielectric layer 328 is provided to create the capacitive coupling 290 (FIG. 6) to electrical contact 320. As a result, direct current provided to electrical contact 320 will be supplied to resistor 284 and alternating current provided to electrical contact 320 will be supplied to lead 326 in order to drive resistor 286.

Figure 9:
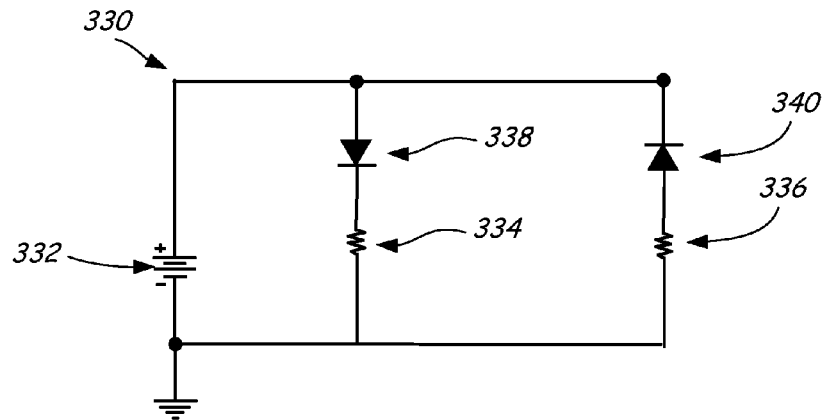
FIG. 9 is an exemplary circuit diagram.

FIG. 9 is an exemplary circuit diagram 330 that can be used to drive separate actuators (in this case heaters) from a single slider body connection in an alternative embodiment. In this embodiment, as drawn, the polarity of the power supply will deliver power preferentially to one heater because of the forward biased diode associated with that heater. Reversal of bias polarity will drive the other heater. Using the circuit illustrated in diagram 330, two separate heaters can be provided to heat different regions of the head 110 or transducer portion 200. Diagram 330 includes a power supply 332 that provides a power source to the electrical circuit, a first resistor (or heater) 334 and a second resistor (or heater) 336. The first resistor 334 heats a first portion of the head 110 and the second resistor 336 heats a second portion of the head 110.

Both resistors 334 and 336 are coupled to ground. Diagram 330 further illustrates a first diode 338 and a second diode 340, which provide coupling elements to the electrical circuit for resistors 334 and 336, respectively. Diode 338 is a forward biased diode and diode 340 is a reverse biased diode. Under forward biasing conditions, diode 338 allows power transmission to resistor 334, such that a first portion of the head is heated. Likewise, under reverse bias conditions, diode 340 allows power transfer to second resistor 336. As a result, reversing the polarity of power provided by power source 332 allows resistors 334 and 336 to be powered separately. In one embodiment, diodes 338 and 340 can be deposited onto a slider 202 using amorphous or polycrystalline materials. A degree of rectification for the diodes can be used to ensure proper operation.

Figure 10:
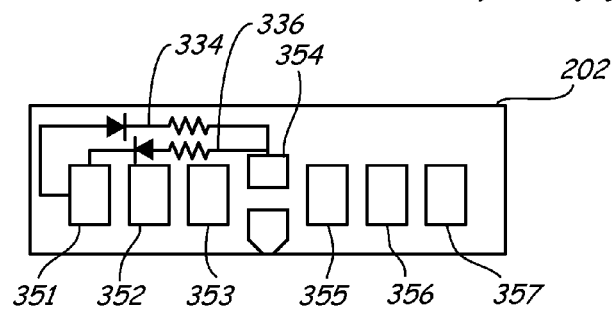
FIG. 10 is a schematic diagram of electrical contacts to a slider body.

FIG. 10 is a schematic diagram of electrical contacts or bond pads on slider 202 in an alternative embodiment of the present invention. As illustrated in FIG. 10, slider body 202 includes bond pads 351, 352, 353, 354, 355, 356 and 357. Bond pads 351, 352, 353, 354, 355, 356 and 357 are similar to bond pads 301, 352, 353, 354, 355, 356 and 307 discussed above. In this embodiment, bond pad 351 is used as the connection to drive both first resistor 334 and second resistor 336 as discussed above in relation to diagram 330 of FIG. 9.

It is also worth noting that actuation of the first portion and the second portion described above can be realized simultaneously. When using the heaters to heat the first portion and the second portion, the first and second portions require time over which to cool and return to a state when power to the heaters is no longer supplied. Using a repeated, alternating polarity power signal in diagram 330 to successively power resistors 334 and 336 allows heat capacity of the first and second portions to maintain an actuated state during time periods where power is diverted to the other heater. Since electrical response time of circuit 330 is faster than the rate of dissipation of thermal energy to the first and second portions, actuation of both the first and second portions can be simultaneously achieved. Alternatively, alternating current and direct current can be supplied to diagram 281 in FIG. 6 to achieve simultaneous actuation of first and second actuators 276, 277 in a manner similar to that described below.

Figure 11:
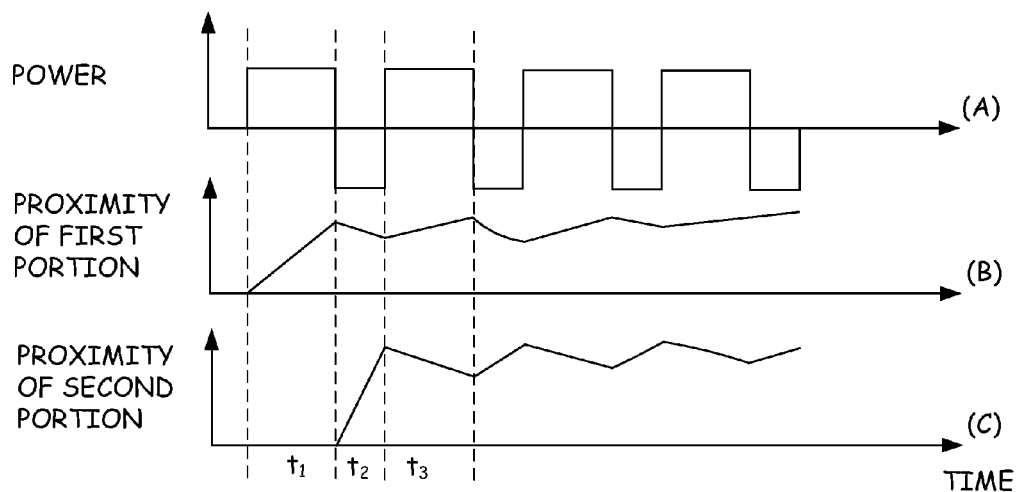
FIG. 11 illustrates graphs of power change in spacing of a first portion and a second portion with a storage medium as a function of time.

FIG. 11 illustrates three graphs including power as a function of time, spacing between the first portion and the media 206 as a function of time, and spacing between a second portion and the storage media 206 as a function of time. Graph A illustrates a power signal switching from a forward biased polarity to a reverse biased polarity as a function of time. During time $t_1$, forward biased polarity provides power to a first actuator, which causes a first portion to be actuated towards a storage medium. Graph B, during time $t_1$, shows that proximity between the first portion and the storage medium is increased. Thus, the first portion is actuated towards the storage medium. Alternatively, Graph C illustrates no actuation of the second portion towards the storage medium during time $t_1$, since no power is supplied to a second actuator. During time $t_2$, power is supplied to the second actuator. The proximity of the first portion to the storage media is reduced during time $t_2$. The proximity of the second portion to the storage media is increased during time $t_2$. At the end of time $t_2$, the first portion has not returned to an initial state. Thus, during time $t_3$, the first portion is closer to the storage media than the initial state. Eventually, continuous switching of the power signal can allow both the first portion and the second portion to reach an asymptotic state, wherein the first portion and the second portion are actuated close to the storage media 206. In one embodiment, several cycles can be required to reach the asymptotic state.

Figure 12:
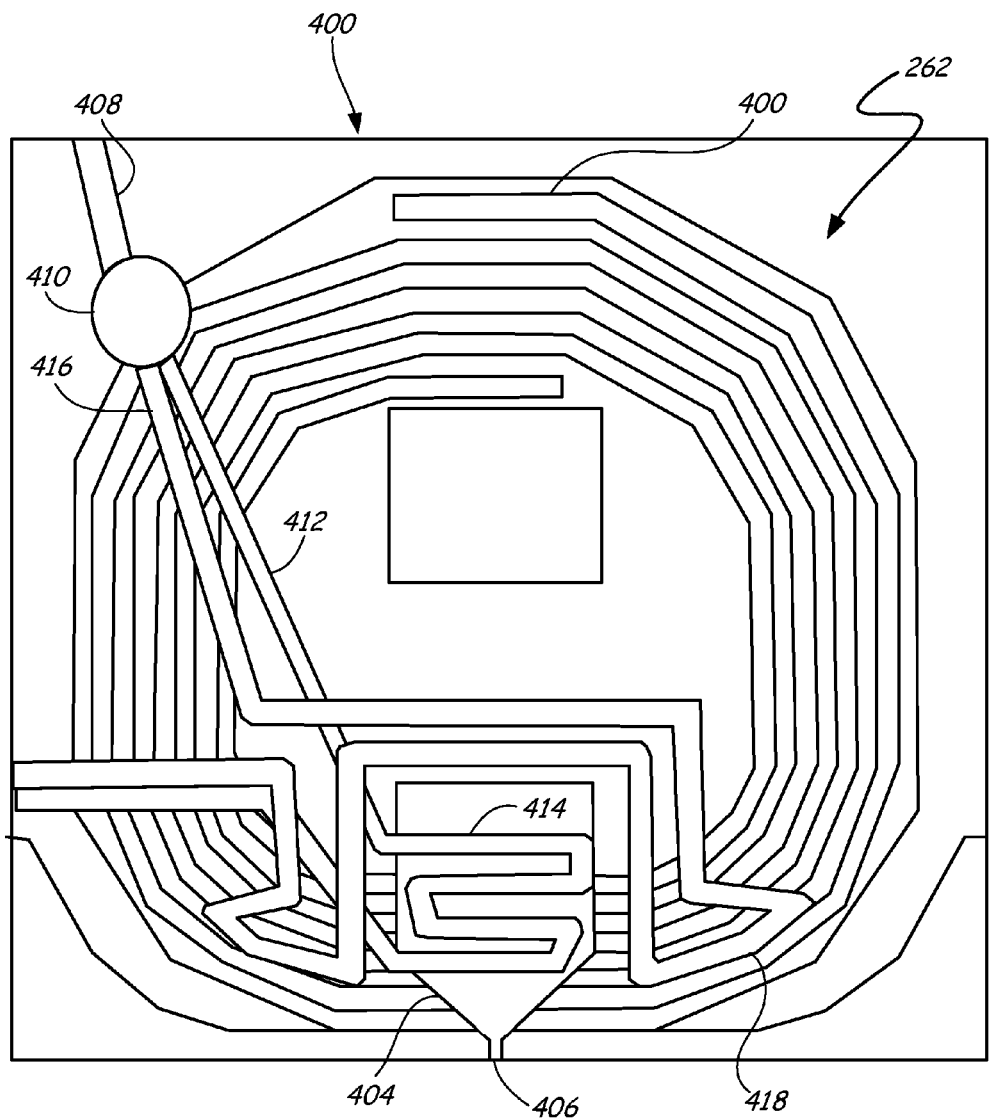
FIG. 12 is a schematic diagram of a writer having a first and a second heater.
Figure 13:
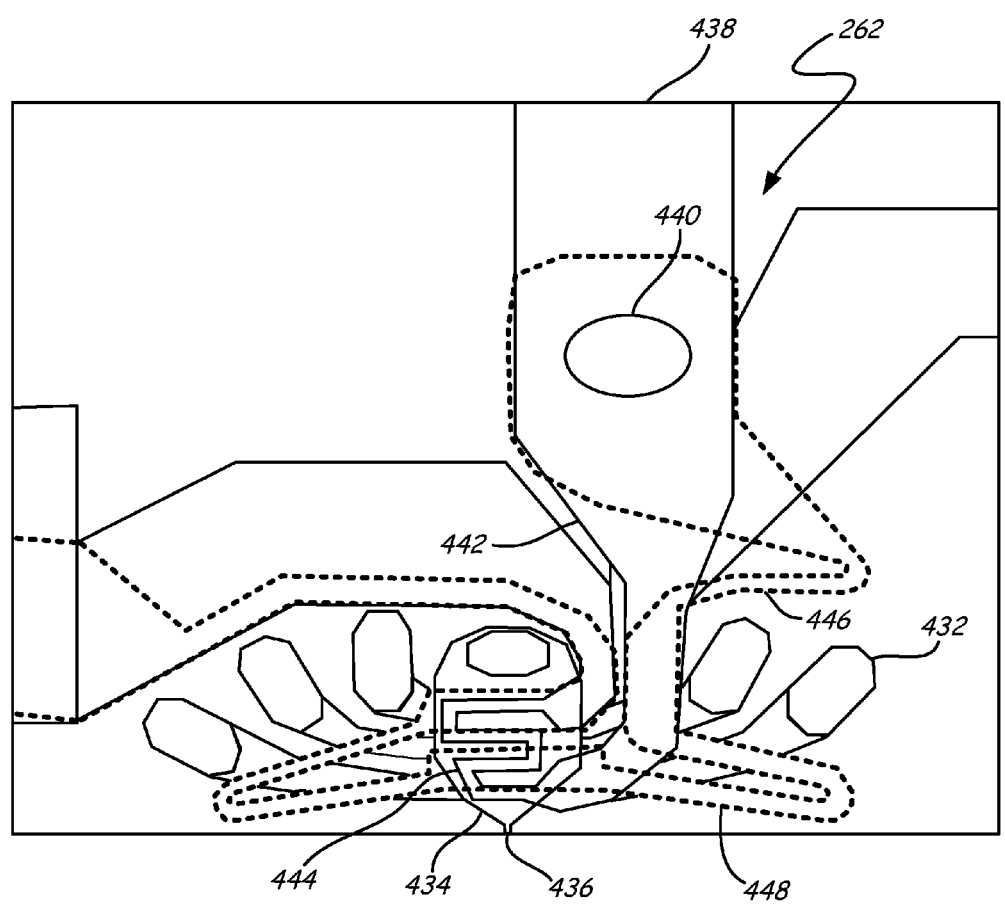
FIG. 13 is a schematic diagram of an alternative design for a writer having a first and a second heater.

FIGS. 12 and 13 illustrate two different writer assemblies 262, although application of the embodiments described herein are not limited to a particular writer configuration. FIG. 12 is a schematic diagram of a writer assembly 262 having a pancake coil writer 400. The spiral pancake writer 400 can be used to provide magnetic flux to write pole 404, which includes a pole tip 406 for interacting with a storage media 206. In the illustrated embodiment, the first and second heaters are fabricated on one or more layers of the transducer portion 200 and are connected to common lead 408 connected to via 410. A first lead 412 is connected to first heater 414 while a second lead 416 is connected to second heater 418. As an example, a capacitor or diode arrangement as discussed above can be positioned proximate via 410 to selectively utilize the first heater 414 and the second heater 418. Heater 414 is adapted to heat a localized portion of transducer portion 200 proximate to the writer assembly 262 such that pole tip 406 is actuated towards the storage media 206. On the other hand, heater 418 is adapted to heat a larger portion that is actuated toward the storage media 206 and is used for contact detection in an illustrated embodiment.

FIG. 13 is a schematic diagram of an alternative design for a writer assembly 262 having first and second heaters. Writer assembly 262 includes a helical coil 432 that provides magnetic flux to a write pole 434 having a pole tip 436. A common lead 438 is connected to a via 440. A first lead 442 is coupled to a first heater 444, while a second lead 446 is coupled to a second heater 448. As an example, a capacitor or diode arrangement as discussed above can be positioned proximate via 440 to selectively utilize first heater 444 and second heater 448. As illustrated, heater 444 is a small, localized heater designed to actuate pole tip 436 towards the storage media 206. Second heater 448 is adapted to heat a larger region that is used for contact detection.

Figure 14:
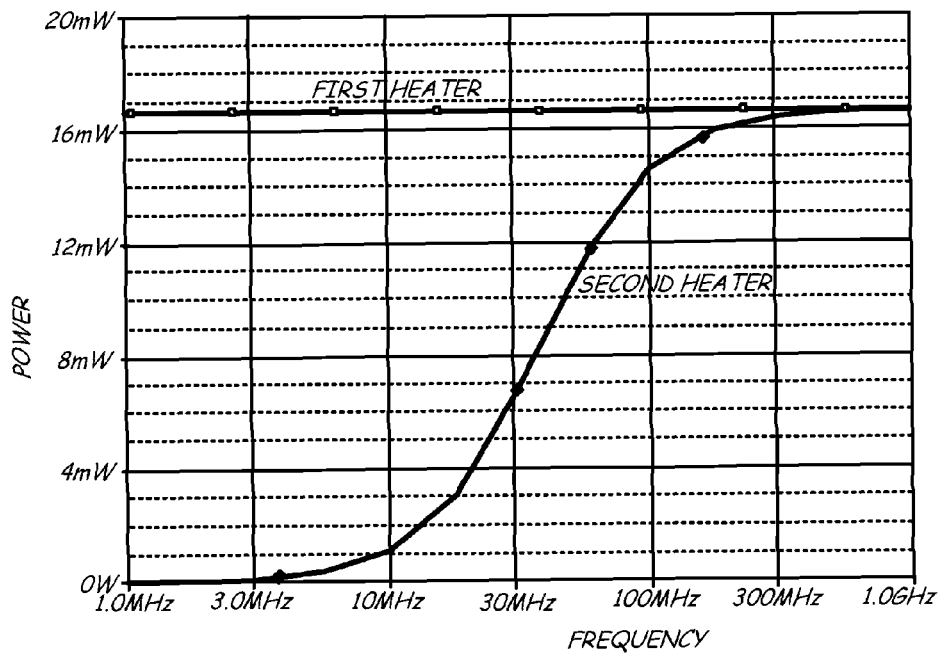
FIG. 14 is a graph of power as a function of frequency of alternating current for a first heater and a second heater.
Figure 15:
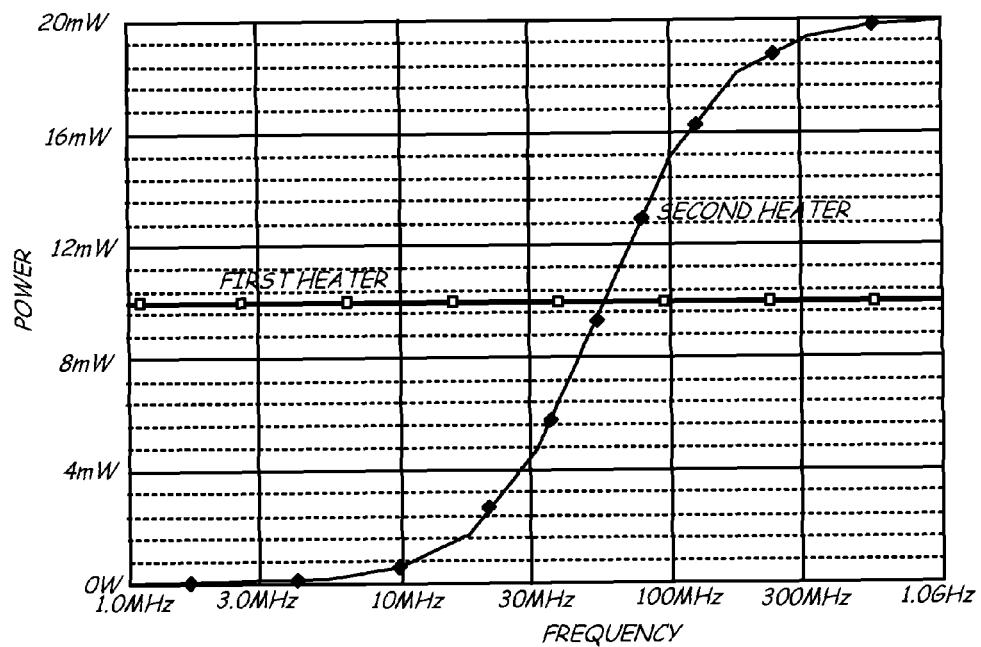
FIG. 15 is a graph of power as a function of frequency of alternating current for a first heater and a second heater.

The resistance of the first heater and the second heater can be adjusted to provide desired power levels to each of the first heater and the second heater. For example, FIG. 14 is a graph of power as a function of frequency of alternating current provided to the second heater. The first heater has a resistance of 60 ohms and the second heater has a resistance of 60 ohms. In FIG. 14, the alternating current frequency varies from 1 MHz to 1 GHz. At approximately 300 MHz, it is illustrated that equal power is applied to both a first heater and a second heater. In order to direct a different amount of power to either the first heater or the second heater, a ratio of the resistance of the first heater to the resistance of the second heater can be adjusted. For example, FIG. 15 illustrates a graph similar to FIG. 14 wherein the resistance of the first heater is 80 ohms and the resistance of the second heater is 40 ohms. The graphs illustrate that a desired resistance of the first heater and the second heater can be selected according to desired power levels. It should be noted that improved control of actuators may use simultaneous application of AC and DC power.

Figure 16:
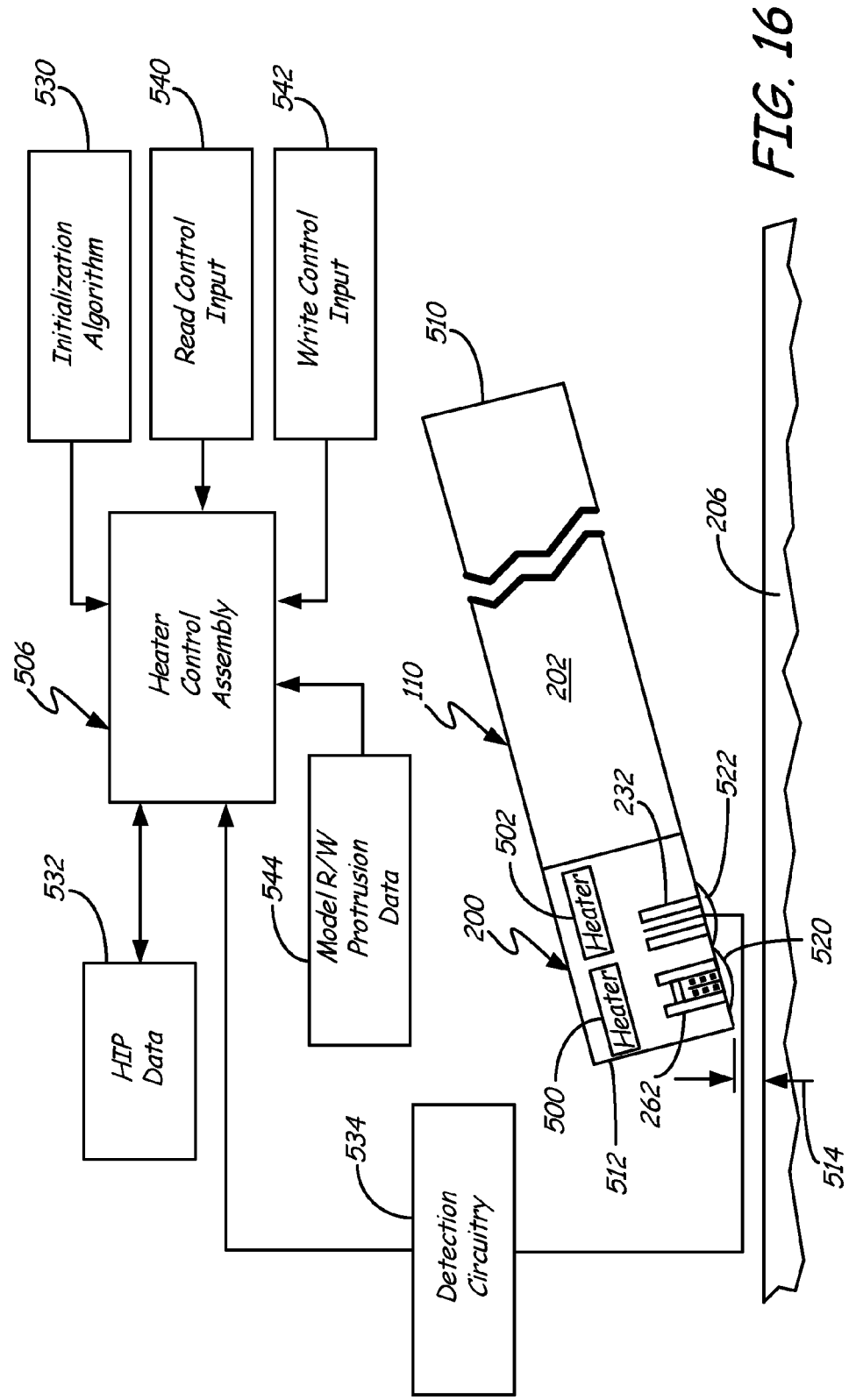
FIG. 16 schematically illustrates operation of heaters on a head to control head media spacing.

In an illustrated embodiment as shown in FIG. 16, the head 110 includes a first heater or actuator 500 proximate to the writer assembly 262 and a second heater or actuator 502 proximate to the reader assembly 232 as previously described. The present application discloses a heater control assembly 506 to energize the actuators or heaters 500, 502 to control the close point or head protrusion for read and/or write operations. The heater control assembly 506 is implemented through one or more hardware or software components of a control circuit including one or more circuit and/or memory components. The slider 202 or head 110 includes a leading edge 510 and a trailing edge 512. The transducer elements (writer assembly 262 and reader assembly 232) are fabricated on the transducer portion 200 proximate the trailing edge 512 of the head 110 as known by those skilled in the art. During operation, the head 110 is orientated at a pitch angle so that the transducer portion 200 of the slider is spaced closer to the media 206 than the leading edge 510 of the head 110. As schematically illustrated in FIG. 16, the transducer portion 200 is spaced from the media 206 to provide a flyheight 514 separating the head 110 from the media 206. The flyheight 514 of the head 110 is defined as the space between the close point of the head 110 and the media 206. The close point of the head can vary based upon variations in fabrication process and localized heating and protrusion of the transducer elements, which in the illustrated embodiment include the writer and reader assemblies 262, 232.

In the illustrated embodiment, the writer assembly 262 is positioned closer to the trailing edge 512 than the reader assembly 232. Operation of the read and write elements generates heat which can cause protrusion of the transducer portion 200 and thus can vary the close point of the head 110 and the head media spacing. In the illustrated embodiment, the first and second heaters 500, 502 are fabricated on the transducer portion 200 to provide localized heating to actively protrude localized portions of the head and vary the close point of the head relative to the reader and writer assemblies 232, 262.

As shown, the second heater 502 is spaced from the first heater 500 in an on-track direction toward the leading edge 510 of the head 110. As shown, the first heater 500 is positioned proximate to the writer assembly 262 to provide a localized protrusion 520 of the write elements and the second heater 502 is positioned proximate to the reader assembly 232 to provide a localized protrusion 522 of the read elements. Thus as shown protrusion 520 generated by the first heater 500 is localized proximate to the writer elements and the protrusion 522 generated by the second heater 502 is localized proximate to the read elements.

As described, operation of the first and second heaters 500, 502 is controlled via the heater control assembly 506, As shown, the heater control assembly 506 utilizes an initialization algorithm 530 to generate heater induced protrusion (HIP) data 532 for heater controlled protrusion of the head 110 for read and/or write operations. In the illustrated embodiment, the initialization algorithm includes instructions to selectively energize the first and second heating elements 500, 502 to generate the HIP data 532. The first and second heating elements 500, 502 are energized to protrude the transducer portion 200 and the heat induced protrusion of the head 110 is measured relative to head media spacing or contact. In illustrated embodiments, the head media spacing or contact is measured via detection circuitry 534.

As shown, the detection circuitry 534 receives an input signal from a sensor element indicative of head media spacing or contact. Illustrative sensor elements include the read element of the reader assembly 232 on the head or other sensors on the head that provide an input signal that varies based upon head media spacing or contact. In an alternative embodiment, the input signal can be provided from a sensor separate from the head, which provides a head media spacing measure or contact detection. Input from the detection circuitry 532 and the applied power level are processed by the heater control assembly 506 to generate HIP data 532. The HIP data 532 is stored on one or more storage media or memory of the control circuitry for use in controlling operation of the heaters 500, 502.

Although FIG. 16 illustrates heaters 500, 502 other actuators which provide a localized head protrusion can be used as appreciated by those skilled in the art. As shown in FIG. 16, the heater control assembly 506 receives read and write control inputs 540, 542. In response to the read and write control inputs 540, 542, the heater control assembly 506 utilizes the HIP data 532 and model read/write protrusion data 544 to apply power to the heaters 500, 502 to optimize the head protrusion profile for read and/or write operations.

Figure 17:
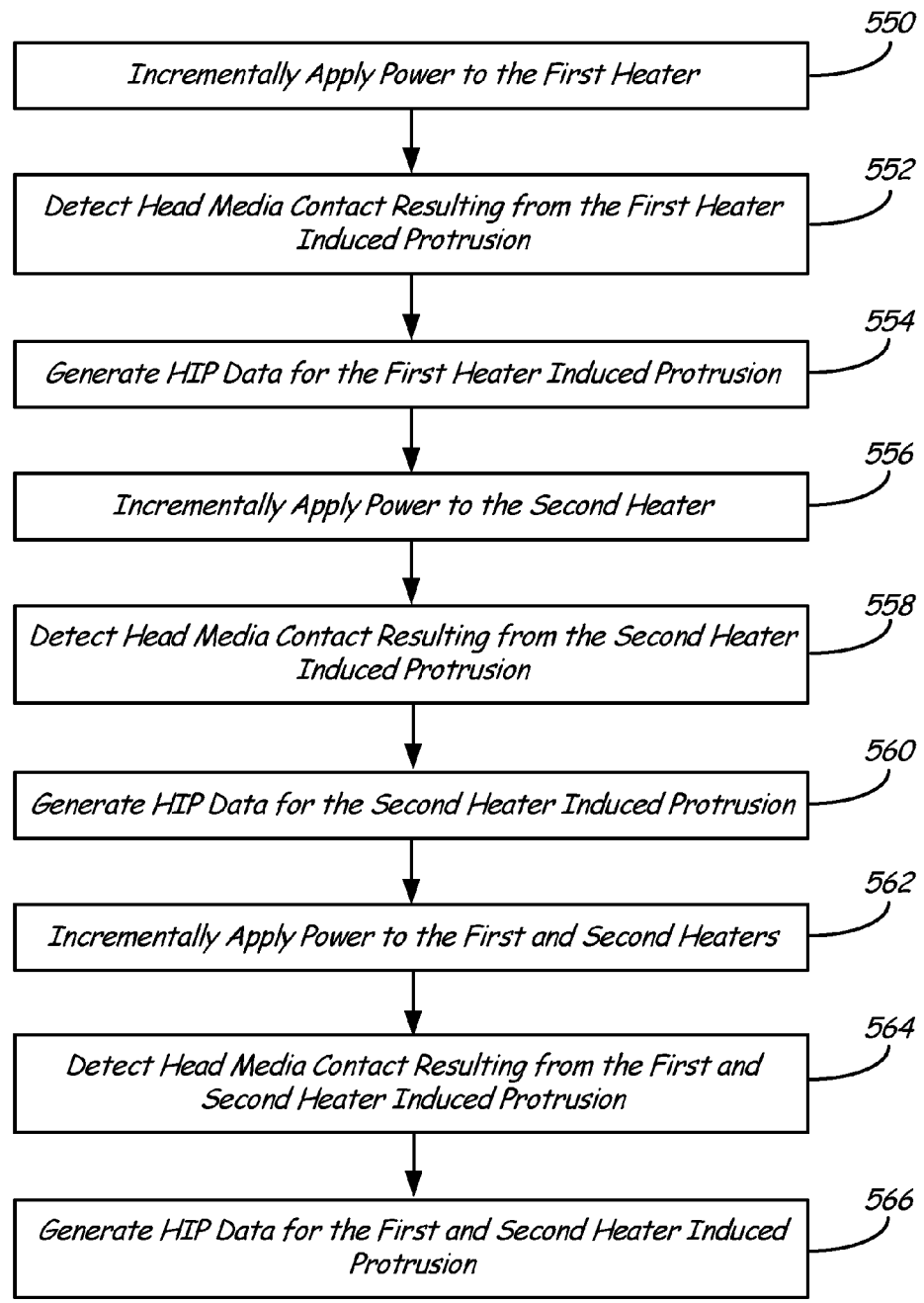
FIG. 17 is a flow chart illustrating an embodiment for generating heat induced head protrusion data.

FIG. 17 illustrates an illustrative embodiment of steps implemented by the initialization algorithm 530 to generate the HIP data 532. As shown in step 550, power is applied to the first heater 500 to protrude portion 520. The supplied power is gradually increased, for example, according to a ramp function to detect contact between the head and the media. Contact is detected as illustrated in step 552 using input from the read element 232 or other sensor as previously described. The applied power level and contact detection data is used to create HIP data for head protrusion responsive to power supplied to the first heater 500 in step 554. In step 556, power is incrementally applied to the second heater 502 and input from the read element or sensor is used to detect contact in step 558. The applied power and contact detection is used to generate HIP data responsive to the power supplied to the second heater 502 in step 560. In step 562, power is incremetally applied to both the first and second heaters 500, 502 and input from the read element 232 or other sensor is used to detect head-media contact in step 564. In step 566 the input power level and contact detection data is used to generate HIP data responsive to heating or power applied to both the first and second heaters 500, 502.

Figure 18:
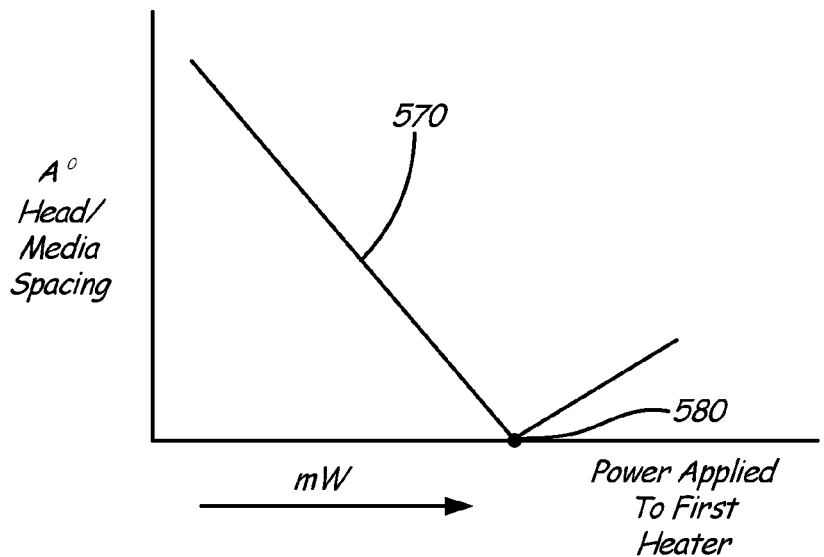
FIGS. 18-20 illustrate heater induced protrusion data responsive to power applied to heating elements on the head.
Figure 19:
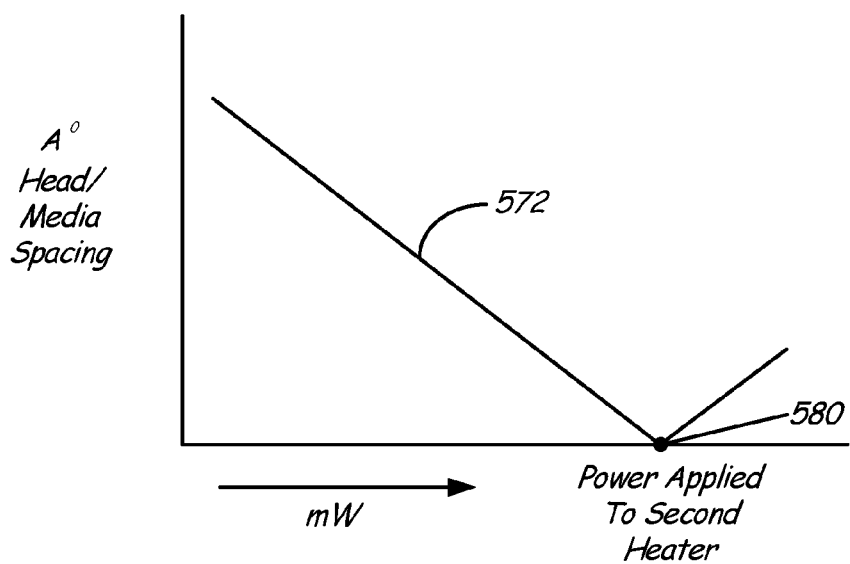
Figure 20:
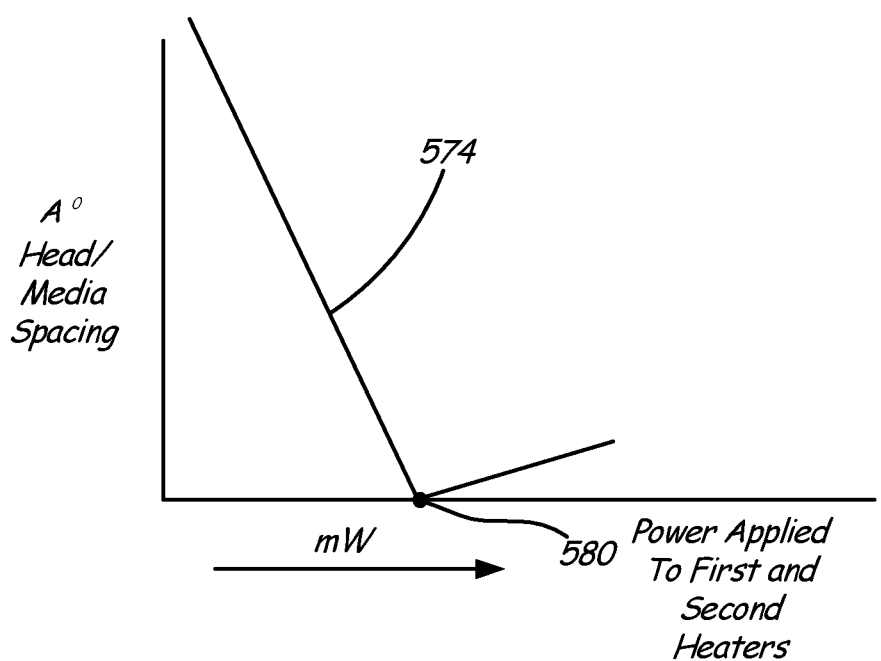

FIGS. 18-20 illustrates HIP data for the heater induced protrusion generated via steps 554, 560, 566 in FIG. 17. Specifically, FIG. 18 illustrates head media spacing 570 in Angstroms relative to applied power to the first heater 500, FIG. 19 illustrates head media spacing 572 relative to applied power to the second heater 502 and FIG. 20 illustrates head media spacing 574 relative to applied power to the first and second heaters 500, 502. As shown, in each of the FIGURES, the data provides a relation between applied power level in mWatts relative to head-media spacing in Angstroms. The graphical relation provides a measure of the applied power relative to head-media contact 580. As described in illustrated embodiments, the head media spacing is determined based upon the amplitude or other attribute(s) of the readback signal from the read element 232. For example, contact between the head and media results in off-track movement of the head resulting in a decrease in the signal amplitude from the read element 232. As generally shown contact is detected for the second heater at a higher power level than the first heater since the second heater 502 is located further from the close point of the head as compared to first heater 500.

Figure 21:
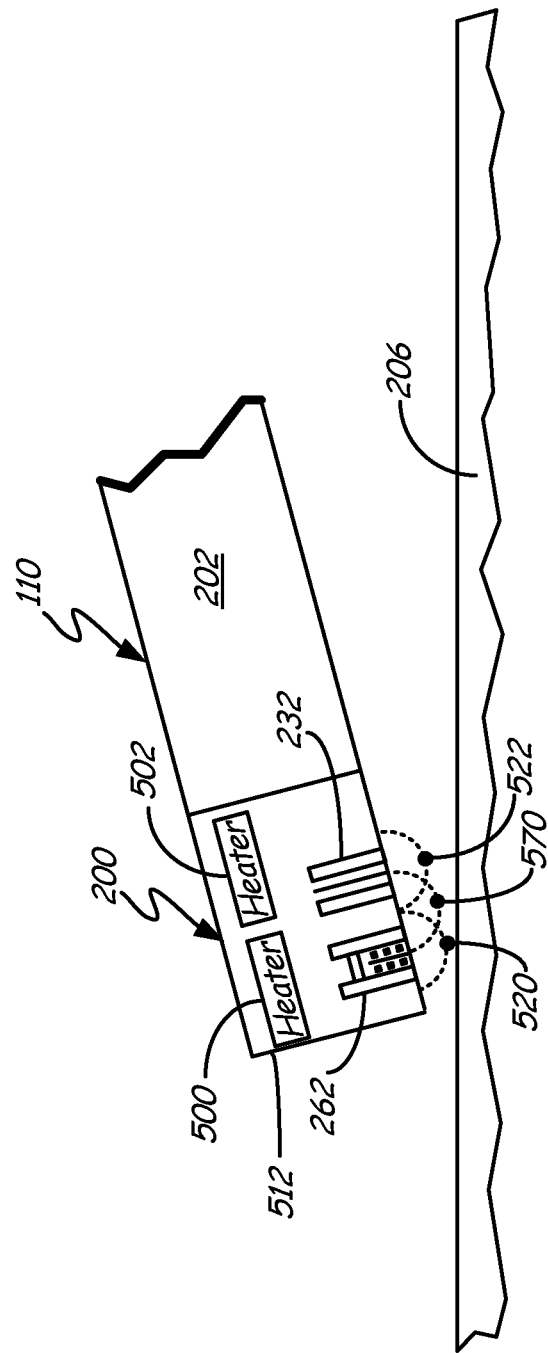
FIG. 21 illustrates protrusion profiles for multiple heaters on the head.
Figure 22:
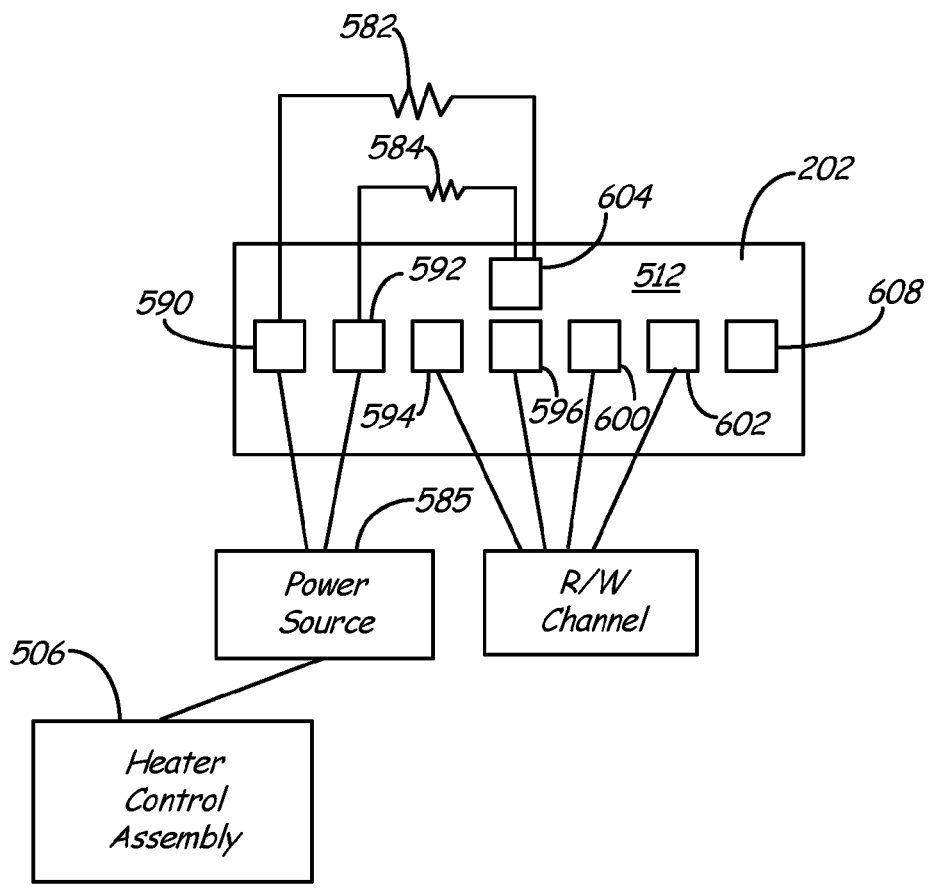
FIG. 22 schematically illustrates a circuit including multiple heating elements on a head.

FIG. 21 illustrates heat induced protrusion profiles and close points for heater 500, heater 502 and combined heaters 500, 502. As previously discussed, energization of heater 500 provides protrusion profile 520 and energization of heater 502 provides protrusion profile 522 spaced uptrack from profile 520. As shown, energization of both heaters 500, 502 provides a protrusion profile 570, which defines a close point between profiles 520 and 522. In an embodiment shown in FIG. 22, the first and second heaters 500, 502 are resistive heating elements 582, 584 fabricated in multiple layers of the transducer portion 200 of the head 110. The heater elements 582, 584 are energized via a power source 585 connected to the heaters through bond pads on the head or slider body 202. As shown, the bond pads on the slider body include heater contact 590 for the first heating element 582, heater contact 592 for the second heating element 584, reader contacts 594, 596, write contacts 600, 602, ground 604 and a lapping guide 608. Thus each heater is driven independently to provide independent adjustment of the applied power level. Although resistive heating elements 582, 584 are shown, other elements that induce protrusion of the transducer portion proportional to the applied power level can be used to control head protrusion as described.

Figure 23:
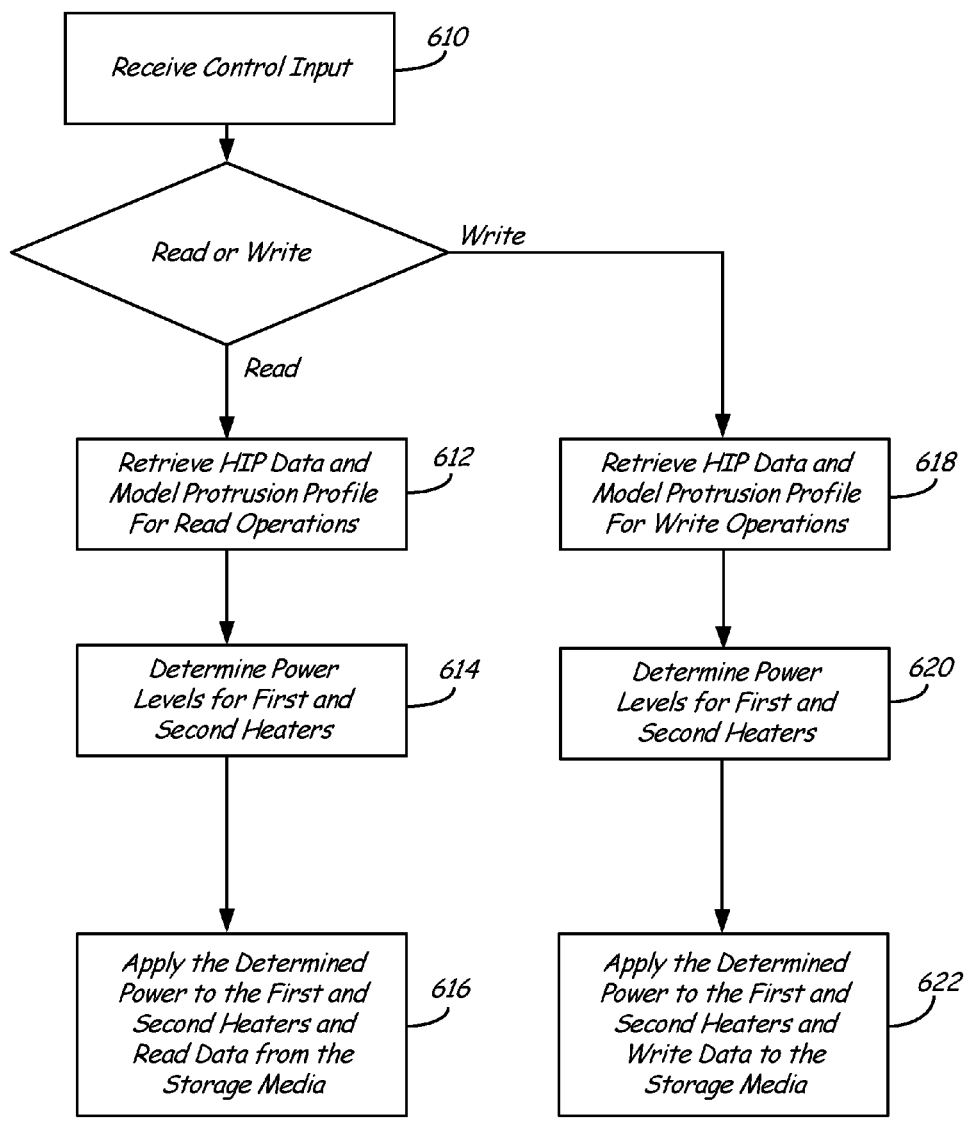
FIG. 23 is a flow chart illustrating control of head media spacing for read and/or write operations.

As previously described in FIG. 16 for read/write operations, the heater control assembly 506 receives read or write control inputs 540, 542 responsive to read or write operation commands as illustrated by step 610 in FIG. 23. If the input control indicates a read command, the control circuitry uses the model protrusion profile 544 for read operations and the HIP data 532. In step 614, power levels for the first and second heaters 500, 502 are determined based upon the data and in step 616 the determined power levels are applied to the first and second heaters 500, 502 for read operations. Likewise for a write operation, the HIP data 532 and model protrusion data 544 for write operations are retrieved in step 628. A first power level is determined for the first heater and a second power levels is determined for the second heater 502 using the model protrusion data 544 and HIP data in step 620. In step 622, the determined power levels for the first and second heaters 500, 502 are applied for write operations. The power level for the first heater 500 for read operations is different from the power level for the first heater 500 for write operations and the power level for the second heater 502 for read operations is different from the power level for the second heater 502 for write operations to shift the close point from proximate to the read element 232 for read operations toward the write element 262 for write operations.

Figure 24:
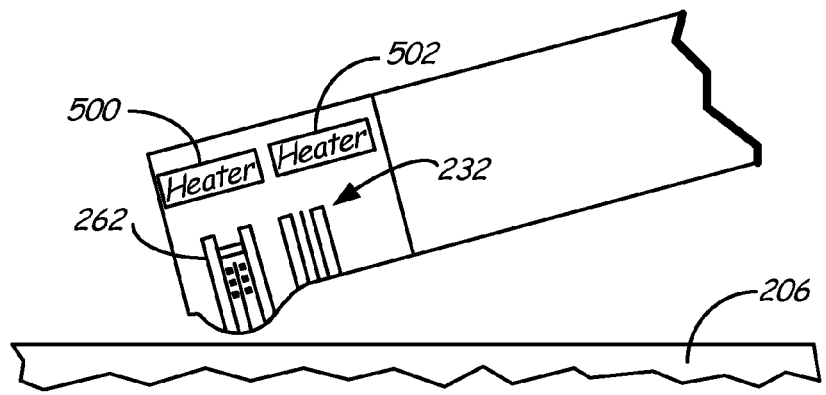
FIGS. 24-25 illustrate head protrusion profiles for read and write operations.
Figure 25:
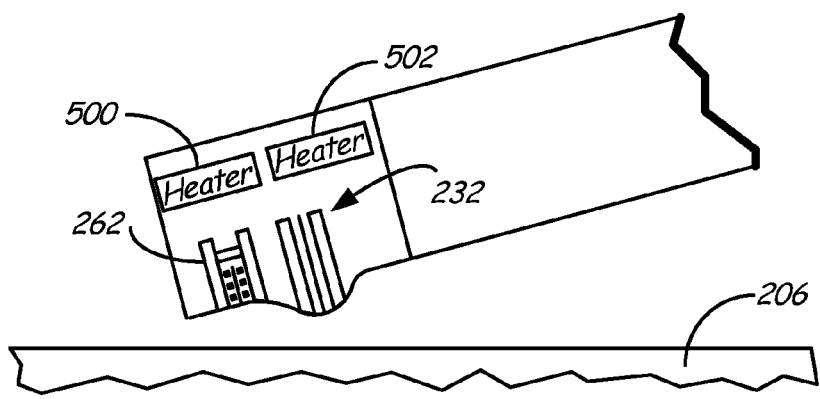

FIG. 24 illustrate a model protrusion profile for read operations and FIG. 25 illustrates a model protrusion profile for write operations. As shown in FIG. 24, the read element protrudes below the write element so that the close point of the head 110 is closer to the read element for read operations to read data from the data storage media 206. Similarly as shown in FIG. 25, the write element protrudes below the read element so that the close point of the head 110 is positioned proximate to the write element for write operations. Thus, power is selectively applied to the first and second heaters to vary the close point and protrusion profile of the head 110 to optimize proximity of the read and/or write elements to the media for read and write operations and to adjust the position of the close point between the read and write elements.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the read/write head while maintaining substantially the same functionality without departing from the scope and spirit of the present invention. In particular, although the application describes two heaters on the transducer portion, additional heaters can be used to control protrusion and the close point of the head for read and write operations. In addition, although the preferred embodiment described herein is directed to a head for a hard disc drive system, it will be appreciated by those skilled in the art that the teachings of the present invention can be applied to other data storage systems, like tape drives, or other applications without departing from the scope and spirit of the present invention.

What is claimed is:

1. A method comprising:
    applying power to a first heater to protrude a transducer portion of a head and gradually increasing the power to provide head contact with a media;
    generating first head protrusion data indicative of the heat induced protrusion responsive to the applied power to the first heater;
    applying power to a second heater spaced from the first heater to protrude the transducer portion of the head and gradually increasing the power to provide the head contact with the media; and
    generating second head protrusion data indicative of the heat induced protrusion responsive to the applied power to the second heater.

2. The method of claim 1 and comprising:
    applying power to both the first and second heaters to protrude the transducer portion of the head and gradually increasing the power to both the first and second heaters to provide contact with the media; and
    generating third head protrusion data indicative of the heat induced protrusion responsive to the applied power to both the first and second heaters.

3. The method of claim 1 wherein the step of applying the power comprises applying the power using a ramp function to gradually increase a power level with respect to time.

4. The method of claim 1 wherein the first heater is proximate to a write assembly and the power is applied to the first heater to protrude a localized portion of the head proximate to the write assembly and the second heater is proximate to a read assembly and the power is applied to the second heater to protrude a localized portion of the head proximate to the read assembly.

5. The method of claim 4 and comprising utilizing the first and second head protrusion data to energize the first and second heaters to provide a first close point between the head and the media for read operations and to energize the first and second heaters to provide a second close point different from the first close point for write operations.

6. The method of claim 1 wherein the step of applying power to the second heater and generating the second head protrusion data comprises:
    applying power to both the first and second heaters and gradually increasing the power to the first and second heaters to provide the head contact with the media; and
    generating the second head protrusion data indicative of the heat induced protrusion responsive to the applied power to both the first and second heaters.

7. The method of claim 6 and comprising:
    applying power to the second heater separate from the first heater; and
    generating third head protrusion data indicative of the heat induced protrusion responsive to the applied power to the second heater separate from the first heater.

8. The method of claim 1 wherein the step of applying the power to the first and second heaters is implemented through instructions from a heater control assembly.

9. The method of claim 1 wherein the step of generating the first and second head protrusion data comprises processing input from a sensor element indicative of the head media contact and coordinating the input from the sensor element to an applied power level for the first and second heaters.

10. The method of claim 9 wherein the sensor element is a read element on the head.

11. A method comprising:
    applying a first power level to a first heating element and a second power level to a second heating element to protrude a transducer portion of a head responsive to a read command to read data from a data storage media;
    adjusting the first power level to the first heating element and the second power level to the second heating element responsive to a write command; and
    applying the adjusted first power level to the first heating element and the adjusted second power level to the second heating element to adjust a protrusion profile of the transducer portion of the head from the protrusion profile for the read command to the protrusion profile for the write command to write data to the data storage media.

12. The method of claim 11 comprising the step of generating head protrusion data by applying power to the first and second heaters and utilizing input from a sensor element responsive to head media spacing to generate the head protrusion data responsive to the applied power to the first and second heaters; and utilizing the head protrusion data to apply the first and second power levels to read data from the data storage media and the adjusted first and second power levels to write data to the data storage media.

13. The method of claim 12 wherein the step of applying power gradually increases an applied power level to the first and second heaters to detect head media contact utilizing the input from the sensor element and the step of generating the head protrusion data utilizes the applied power level and the head media contact based upon the input from the sensor element.

14. The method of claim 12 wherein the step of applying the power to the first and second heaters comprising;
    applying the power to the first heater;
    measuring head media contact responsive to the applied power to the first heater;
    applying the power to the second heater; and
    measuring the head media contact responsive to the applied power to the second heater.

15. The method of claim 12 wherein the step of applying the power to the first and second heaters comprises:
    applying the power to each of the first and second heaters separately;
    generating first head protrusion data responsive to the applied power to the first heater and second head protrusion data responsive to the applied power to the second heater;
    applying the power to both the first and second heaters; and
    generating third head protrusion data responsive to the applied power to both the first and second heaters; and
    utilizing the first, second and third head protrusion data to determine the first and second power levels to apply to the first and second heaters to read data from the data storage media and the adjusted first and second power levels to write data to the data storage media.

16. A method comprising:
    energizing a first actuator on a head and a second actuator on the head spaced from the first actuator by applying power to the first actuator and the second actuator to move a transducer portion of the head towards a media surface and increasing the power until the head contacts the media surface;

detecting the contact between the head and the media surface as a result of energizing the first actuator and the second actuator;

energizing one of the first or second actuators by applying power to the first or second actuator utilizing an applied power level to the first actuator and the applied level to the second actuator at which contact is detected between the head and the media surface.

17. The method of claim 16 where the first and second actuators are heaters fabricated on the transducer portion of the head.

18. The method claim 16 wherein the step of applying the power to the first and second actuators applies power to both the first and second actuators until the head contacts the media surface.

19. The method of claim 16 wherein the step of applying the power to the first and second actuators applies power to the first actuator until the head contacts the media surface in a first step and applies the power to the second actuator until the head contacts the media surface in a second step following the first step.

20. The method of claim 16 wherein the step of applying the power to the first actuator and the second actuator applies power to both the first and second actuators until the head contacts the media surface in one step and applies the power separately to the first and second actuators in additional steps.

* * * * *

UNITED STATES PATENT AND TRADEMARK OFFICE
CERTIFICATE OF CORRECTION

| | | |
|---|---|---|
| PATENT NO. | : 8,724,263 B2 | Page 1 of 1 |
| APPLICATION NO. | : 13/532143 | |
| DATED | : May 13, 2014 | |
| INVENTOR(S) | : Erik J. Hutchinson et al. | |

It is certified that error appears in the above-identified patent and that said Letters Patent is hereby corrected as shown below:

In the Claims

Claim 18, Column 13, Line 12: Please delete "method claim" and insert --method of claim--.

Signed and Sealed this
Twenty-third Day of September, 2014

Michelle K. Lee
*Deputy Director of the United States Patent and Trademark Office*